3,481,730
N,N-DI-LOWER ALKYL-2-NAPHTHAMIDE AS AN ALGAECIDE
John D. Douros, Jr., Fanwood, N.J., and William D. Vanderwerff, Wilmington, Del., assignors to Sun Oil Company, Philadelphia, Pa., a corporation of New Jersey
No Drawing. Original application Oct. 7, 1963, Ser. No. 314,537, now Patent No. 3,305,583, dated Feb. 21, 1967. Divided and this application May 6, 1966, Ser. No. 571,363
Int. Cl. A01n 9/20
U.S. Cl. 71—67        8 Claims

ABSTRACT OF THE DISCLOSURE

This invention relates to a method killing chlorophyll-containing algae with N,N-di-lower alkyl-2-naphthamides.

---

This is a division of application Ser. No. 314,537, filed Oct. 7, 1963, now U.S. Patent 3,305,583.

This invention relates to certain novel naphthalene amides and to their use as materials for killing algae. More particularly, this invention relates to the use of N,N-di-lower alkyl-2-naphthamides for killing chlorophyll-containing algae, and to methods of preparing these compounds.

The presence of algae in water generally results in such deleterious effects as rampant plant growth in large bodies of water, discoloration, bad taste and odor of water in streams, pools and the like, as well as blockage of pipes, filters, tanks and similar industrial apparatus. Since the volume of water to be treated is usually quite large, it is essential that highly effective yet low cost algaecides be found to control such growth. By highly effective is meant compounds which will kill algae at sufficiently low concentrations that the algaecide itself will not affect the quality or usefulness of the water to be so treated, nor the aquatic life contained therein, particularly fish.

It has now been found that these and other desiderata may be achieved by the use of such N,N-di-lower alkyl-naphthamides as N,N-dimethyl-2-naphthamide, N,N-diethyl-2-naphthamide and the like in concentrations as low as 10 parts per million of water.

The effectiveness of N,N-diethyl-2-naphthamide as an algaecide was determined by the following tests:

Four different algae cultures were each placed in a separate flask containing a dilute aqueous sugar solution as the nutrient. Ethyl alcohol was then added to the flask containing 100 µg./ml. of naphthamide in an amount sufficient to give an ethyl alcohol concentration of 3% by volume. The purpose of the alcohol was to insure rapid and complete solution of the higher concentration of N,N-diethyl-2-naphthamide. The algae concentration in each flask was approximately $10^5$ cells per ml. of solution, including both nutrient and alcohol. The various species of algae present as indicated in Table I below are representative of the major classes of algae.

To each flask was then added a known amount of N,N-diethyl-2-naphthamide, the amount being indicated in Table I as micrograms per ml. of solution. Since most of the solution is water, the stated amounts are essentially equivalent to parts per million parts of solution. For comparative purposes four more samples were prepared in the same manner as above except that no N,N-diethyl-2-naphthamide was added. Similarly, as an additional control, corresponding samples were prepared to which just ethanol was added.

The extent to which the algae were killed was determined eight days later by visual observation of the color and turbidity of the solutions in each flask and comparison with the untreated control flasks. Initially each solution had the color characteristic of the algae present therein. As the algae were killed, the color disappeared due to the decrease in chlorophyll production by the algae. When all the algae were killed, the solution was colorless. Similarly, as the algae were killed, the solutions became less turbid; when all the algae were killed the solution was clear.

The results of the above tests were as follows:

TABLE I

| Concentration µg/ml. | Scenedesmus obliquus | Chlorella vulgaris | Oscillatoria borneti | Coccohloris elabens |
|---|---|---|---|---|
| 10 | +++ | ++ | ++ | ++ |
| 5%* | ++ | ++ | ++ | ++ |
| 10 | + | + | + | + |
| 3% ethanol | +++ | ++ | ++ | ++ |
| None | ++++ | ++++ | ++++ | ++++ |

++++ No inhibition.
+++ 25% inhibition.
++ 50% inhibition.
+ 75% inhibition.
− 100% inhibition.
* 3% ethanol was used only in the case of the highest concentration of compound.

A second test was then run against the above organisms as well as two additional organisms using similar conditions except that the N,N-diethyl-2-naphthamide was suspended in sterile water instead of ethyl alcohol, and the readings were taken after six days' growth. The results were as follows.

TABLE II

| | Scenedesmus obliquus | Chlorella vulgaris | Anabena Catenula | Oscillatoria borneti | Coccochloris elabens | Synurs sp. |
|---|---|---|---|---|---|---|
| Concentration µg/ml.: | | | | | | |
| 100 | + | ++ | − | − | − | − |
| 30 | +++ | ++ | − | ± | − | ± |
| 10 | ++++ | ++++ | ++ | ++ | + | − |
| None | ++++ | ++++ | +++ | +++ | ++ | ± |

++++ No inhibition.
+++ 25% inhibition.
++ 50% inhibition.
+ 75% inhibition.
− 100% inhibition.

It will seen from the above data that N,N-diethyl-2-naphthamide gives up to 100% protection against a wide range of algae in concentrations of from about 10–100 p.p.m. The amount of N,N-di-lower alkyl-2-naphthamide added to the water will vary depending upon such factors as the type of algae present, the nature of the body of water, i.e. flowing stream vs. small lake etc., and the inherent ability of the body of water to support algae growth. This inherent ability in turn depends upon such factors as exposure to sunlight, salinity, pH and the like. While in most cases the concentration of naphthamide required to kill or inhibit the growth of all algae will vary from 10–100 p.p.m., the preferred amount is in the range of 30–100 p.p.m.

The N,N-di-lower alkyl-2-naphthamides can be added to the water according to conventional techniques for algaecide application. When treating a lake or other body of water which is relatively calm, the conventional procedure is to spray an aqueous solution of the algaecide over the surface of the water. For algaecides not readily soluable in water the algaecide is normally pre-dissolved in a water-miscible solvent. In the case of the instant naphthamides, either water or ethanol may be used, while in the case of moving water, such as that in a water-treating plant, the algaecide can be added to the water in small amounts at periodic intervals.

The N,N-di-lower alkyl-2-naphthamides, subject of the present invention, are conveniently prepared by reacting a naphthoyl halide, as for example naphthoyl chloride, with a di-lower alkylamine in a suitable organic solvent such as ether, acetone or the like at reflux temperatures, and recovering the corresponding N,N-di-lower alkyl-2-naphthamide by conventional means. Typical examples of methods of preparing the algaecides of the invention are illustrated below:

EXAMPLE I

N,N-dimethyl-2-naphthamide

A solution of 190 grams of 2-naphthoyl chloride in 500 ml. of ether is added slowly to a stirred solution of 250 ml. of dimethylamine in 500 ml. of ether in a two-liter flask fitted with a reflux condenser. The mixture is stirred for one hour after all of the naphthoyl chloride has been added. The ether solution is then washed first with dilute NaOH, again with water, dried over anhydrous $Na_2SO_4$, and the ether stripped off to yield N,N-dimethyl-2-naphthamide.

In accordance with the foregoing procedure, but substituting dipropylamine for dimethylamine, there is obtained the corresponding N,N-dipropyl-2-naphthamide.

EXAMPLE II

N,N-diethyl-2-naphthamide

A solution of 190 grams of 2-naphthoyl chloride in 500 ml. of ether is added slowly to a stirred solution of 250 ml. of diethylamine in 500 of ether in a two-liter flask filled with a reflux condenser. The mixture is stirred for one hour after all of the naphthoyl chloride has been added. The ether solution is then washed first with water, then with dilute NaOH, again with water, dried over anhydrous $Na_2SO_4$, and the ether stripped off. The product obtained is a slightly yellowish oil which may be distilled under vacuum if desired to yield N,N-diethyl-2-naphthamide.

In accordance with the foregoing procedure, but substituting dibutylamine, for diethylamine, there is obtained the corresponding N,N-dibutyl-2-naphthamide.

The invention claimed is:

1. A method of killing chlorophyll-containing algae which comprises applying an effective algaecidal amount of an N,N-di-lower alkyl-2-naphthamide to chlorophyll-containing algae.

2. The method according to claim 1 wherein the algaecide is N,N-dimethyl-2-naphthamide.

3. The method according to claim 1 wherein the algaecide is N,N-diethyl-2-naphthamide.

4. A method of killing chlorophyll-containing algae in water which comprises adding an effective algaecidal amount of an N,N-di-lower alkyl-2-naphthamide to the water.

5. The method according to claim 4 wherein the amount of said N,N-di-lower alkyl-2-naphthamide is in the range of 10–100 parts per million parts of water.

6. The method according to claim 4 wherein the amount of said N,N-di-lower alkyl-2-naphthamide is in the range of 30–100 parts per million parts of water.

7. The method according to claim 4 wherein said algae are selected from the genera consisting of Scenedesmus, Chlorella, Anabena, Oscillatoria, Coccochloris and Synura.

8. A method of killing chlorophyll-containing algae selected from the genera consisting of Scenedesmus, Chlorella, Anabena, Oscillatoria, Coccochloris and Synura which comprises adding to water containing said algae from 30–100 parts per million parts of water of N,N-diethyl-2-naphthamide.

References Cited

UNITED STATES PATENTS

| | | | |
|---|---|---|---|
| 2,904,465 | 9/1959 | Moorefield | 167—32 |
| 3,035,969 | 5/1962 | Hartle | 167—32 |
| 3,252,855 | 5/1966 | Fairfield | 167—13 |

OTHER REFERENCES

Alexander et al.: Journal of Org. Chem., vol. 25, pp. 626–632 (1960).

Higuchi et al.: Anal. Chem., vol. 34, pp. 400–403 (March 1962).

ALBERT T. MEYERS, Primary Examiner

JEROME D. GOLDBERG, Assistant Examiner